United States Patent
Unnikrishnan et al.

(10) Patent No.: US 11,416,296 B2
(45) Date of Patent: Aug. 16, 2022

(54) SELECTING AN OPTIMAL COMBINATION OF CLOUD RESOURCES WITHIN BUDGET CONSTRAINTS

(71) Applicant: INTERNATIONAL BUSINESS MACHINES CORPORATION, Armonk, NY (US)

(72) Inventors: Priya Unnikrishnan, Toronto (CA); Lior Aronovich, Thornhill (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 191 days.

(21) Appl. No.: 16/696,132

(22) Filed: Nov. 26, 2019

(65) Prior Publication Data
US 2021/0157644 A1  May 27, 2021

(51) Int. Cl.
*G06F 9/50* (2006.01)
*H04L 67/10* (2022.01)
*H04L 47/70* (2022.01)

(52) U.S. Cl.
CPC .......... *G06F 9/5005* (2013.01); *H04L 47/827* (2013.01); *H04L 67/10* (2013.01); *G06F 2209/506* (2013.01)

(58) Field of Classification Search
CPC .. G06F 9/5005; G06F 2209/506; G06F 9/505; G06F 9/5022; G06F 9/5072
(Continued)

(56) References Cited

U.S. PATENT DOCUMENTS

| | | | | |
|---|---|---|---|---|
| 8,924,539 B2 * | 12/2014 | Ferris | .................... | G06F 9/5072 709/224 |
| 9,665,388 B2 * | 5/2017 | Ashok | .................... | G06F 9/5038 |
| 9,912,607 B2 | 3/2018 | Steinder et al. | | |
| 10,057,139 B2 | 8/2018 | Dong et al. | | |
| 10,922,637 B2 * | 2/2021 | Featherstone | .... | G06Q 10/06313 |

(Continued)

FOREIGN PATENT DOCUMENTS

CN     108449394 A  *  8/2018
WO   WO-2020010325 A1 *  1/2020  ........... H04L 9/0643

OTHER PUBLICATIONS

Li et al. CN108449394A Description Translation, Aug. 24, 2018, [database online], [retrieved on Jul. 30, 2021] Retrieved from Espacenet using Internet <URL:https://worldwide.espacenet.com/publicationDetails/description?CC=CN&NR=108449394A&KC=A&FT=D&ND=3&date=20180824&DB=&locale=en_EP>, pp. 1-21 (Year: 2018).*

(Continued)

*Primary Examiner* — Meng Ai T An
*Assistant Examiner* — Hsing Chun Lin
(74) *Attorney, Agent, or Firm* — Griffiths & Seaton PLLC

(57) ABSTRACT

Selecting an optimal combination of cloud resources within budget constraints, by a processor. All possible combinations for cloud resource bundles are computed which are available for allocation. The possible combinations are filtered according to predetermined criteria. The filtered possible combinations are divided into a first set that satisfies an overall workload demand for resources and a second set that partially satisfies the overall workload demand for resources. A level of goodness may be calculated for one or both of the first and second sets, and resources may be allocated from the first or second set to a cluster according to the calculated level of goodness. In some embodiments, the level of goodness may be defined based on the relative desirability (i.e., a user's preference) of aspects such as compute power, cost of resources, and the distribution or co-location of respective resources of the cloud resource bundles.

18 Claims, 14 Drawing Sheets

(58) Field of Classification Search
CPC ....... H04L 47/827; H04L 67/10; H04L 47/78; H04L 67/02
See application file for complete search history.

(56) References Cited

U.S. PATENT DOCUMENTS

| | | |
|---|---|---|
| 2011/0313902 A1 | 12/2011 | Liu et al. |
| 2014/0136295 A1 | 5/2014 | Wasser |
| 2014/0278807 A1 | 9/2014 | Bohacek |
| 2016/0380906 A1 | 12/2016 | Hodique et al. |
| 2022/0083386 A1* | 3/2022 | Almeida ............... G06F 9/5038 |

OTHER PUBLICATIONS

Subramanian et al. Application based brokering algorithm for optimal resource provisioning in multiple heterogeneous clouds, Dec. 14, 2015, [retrieved Feb. 20, 2022], Retrieved from <URL:https://link.springer.com/content/pdf/10.1007/s40595-015-0055-8.pdf>, pp. 1-14 (Year: 2015).*

Wright et al. A constraints-based resource discovery model for multi-provider cloud environments, 2012, [retrieved Jun. 12, 2022] Retrieved from <URL:https://journalofcloudcomputing.springeropen.com/track/pdf/10.1186/2192-113X-1-6.pdf>, pp. 1-14 (Year: 2012).*

"Heuristic for resources allocation on utility computing infrastructures", Silva et al., Dec. 1-5, 2008 (6 Pages).

"The Efficiency of Resource Allocation Mechanisms for Budget-Constrained Users", Caragiannis et al., ACM EC'18, Jun. 18-22, 2018, Ithaca, NY, USA., (18 Pages).

"A Declarative Optimization Engine for Resource Provisioning of Scientific Workflows in IaaS Clouds", Zhou et al., Jun. 15-20, 2015, (12 Pages).

* cited by examiner

ALL COMBINATIONS OF RESOURCE BUNDLES

| CLOUD RESOURCE BUNDLES | $R_1$ | $R_2$ | $R_3$ |
|---|---|---|---|
| MAXIMUM NUMBER OF INSTANCES | $M_1$ | $M_2$ | $M_3$ |
| COST OF AN INSTANCE | $C_1$ | $C_2$ | $C_3$ |
| NUMBER OF INSTANCES CURRENTLY AVAILABLE | $N_1$ | $N_2$ | $N_3$ |
| INSTANCES TO ALLOCATE | $A_1$ | $A_2$ | $A_3$ |

| COMBINATION TUPLE $<A_1, A_2, A_3>$ |
|---|
| <0, 0, 1> |
| <0, 0, 2> |
| ... |
| <0, 0, $N_3$> |
| <0, 1, 0> |
| <0, 1, 1> |
| <0, 1, 2> |
| ... |
| <0, 1, $N_3$> |
| ... |
| <0, $N_2$, $N_3$> |
| <1, 0, 0> |
| ... |
| <$N_1$, $N_2$, $N_3$> |

FIG. 10

SCORE ASSIGNMENT FOR ALL COMBINATIONS OF RESOURCE BUNDLES

| COMBINATION TUPLE <A_1, A_2, A_3> | COMPUTE POWER | | | | | | COST | | DISTRIBUTION/CO-LOCATION | | | | | | |
|---|---|---|---|---|---|---|---|---|---|---|---|---|---|---|---|
| SUB-ASPECT SCORE | CORE | MEMORY | STORAGE | NETWORK BANDWIDTH | I/O CAPACITY | | COST | | TOTAL NUMBER OF RESOURCE BUNDLES | | NUMBER OF DISTINCT RESOURCE BUNDLES | | NUMBER OF DISTINCT RELIABILITY ZONES | | NUMBER OF DISTINCT CLOUD PROVIDERS |
| | | | | | | | | | HIGH | LOW | HIGH | LOW | HIGH | LOW | HIGH | LOW |
| <0,0,1> | | | | | | | | | | | | | | | | |
| <0,0,2> | | | | | | | | | | | | | | | | |
| <0,0,N_3> | | | | | | | | | | | | | | | | |
| <N_1, N_2, N_3> | | | | | | | | | | | | | | | | |

1100

FIG. 11

SELECTING AN OPTIMAL COMBINATION OF CLOUD RESOURCES WITHIN BUDGET CONSTRAINTS

BACKGROUND OF THE INVENTION

Field of the Invention

The present invention relates to cloud computing, and more specifically to exemplary embodiments for selecting optimal resources according to budget restrictions in infrastructure as a service (IaaS) and platform as a service (PaaS) systems.

Description of the Related Art

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together and provided to a client or an end user. Cloud computing is often provided "as a service" over the Internet. Two distinct layers of such services in cloud computing can be in the form of the infrastructure as a service (IaaS) layer and the platform as a service (PaaS) layer.

The PaaS layer is a combination of a development platform and a set of software subsystems or components that may be used to deliver a fully functional product or service. It provides a platform on which software developers may build new applications or extend existing ones without the complexity of owning and managing the underlying hardware and software and provisioning hosting capabilities. In other words, the PaaS layer provides the supporting platform to enable the end user to develop his or her own solutions.

The IaaS layer delivers computer infrastructure, including a virtualization environment, as a service. This may include servers, software, data-center space and network equipment, available in a single bundle and may be billed as per usage in a utility computing model. IaaS may generally be used by organizations that have the in-house expertise to manage their IT requirements but may not have the infrastructure. They may hire the infrastructure from IaaS providers and load up their libraries, applications, and data, after which they may configure them themselves.

SUMMARY OF THE INVENTION

Various embodiments for selecting an optimal combination of cloud resources within budget constraints are provided. In one embodiment, all possible combinations for cloud resource bundles which are available for allocation are computed. The possible combinations are filtered according to predetermined criteria. The filtered possible combinations are divided into a first set that satisfies an overall workload demand for resources and a second set that partially satisfies the overall workload demand for resources. If the first set is not empty, a level of goodness is calculated for each one of the combinations in the first set, the first set is ordered by the level of goodness, and a selection is made for provisioning resources from the first set. If the first set is empty and the overall workload demand is not required to be fully satisfied, a level of goodness is calculated for each one of the combinations in the second set, the second set is ordered by the level of goodness, and a selection is made for provisioning resources from the second set. In some embodiments, the level of goodness may be defined based on the relative desirability (i.e., a user's preference) of aspects such as compute power, cost of resources, and the distribution or co-location of respective resources of the cloud resource bundles.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10 is a block diagram depicting combinations of resource bundles, according to embodiments of the present invention;

FIG. 11 is a table diagram depicting a scoring assignment table for combinations of cloud resource bundles, according to embodiments of the present invention.

DETAILED DESCRIPTION OF THE DRAWINGS

System Description

Figure 1:
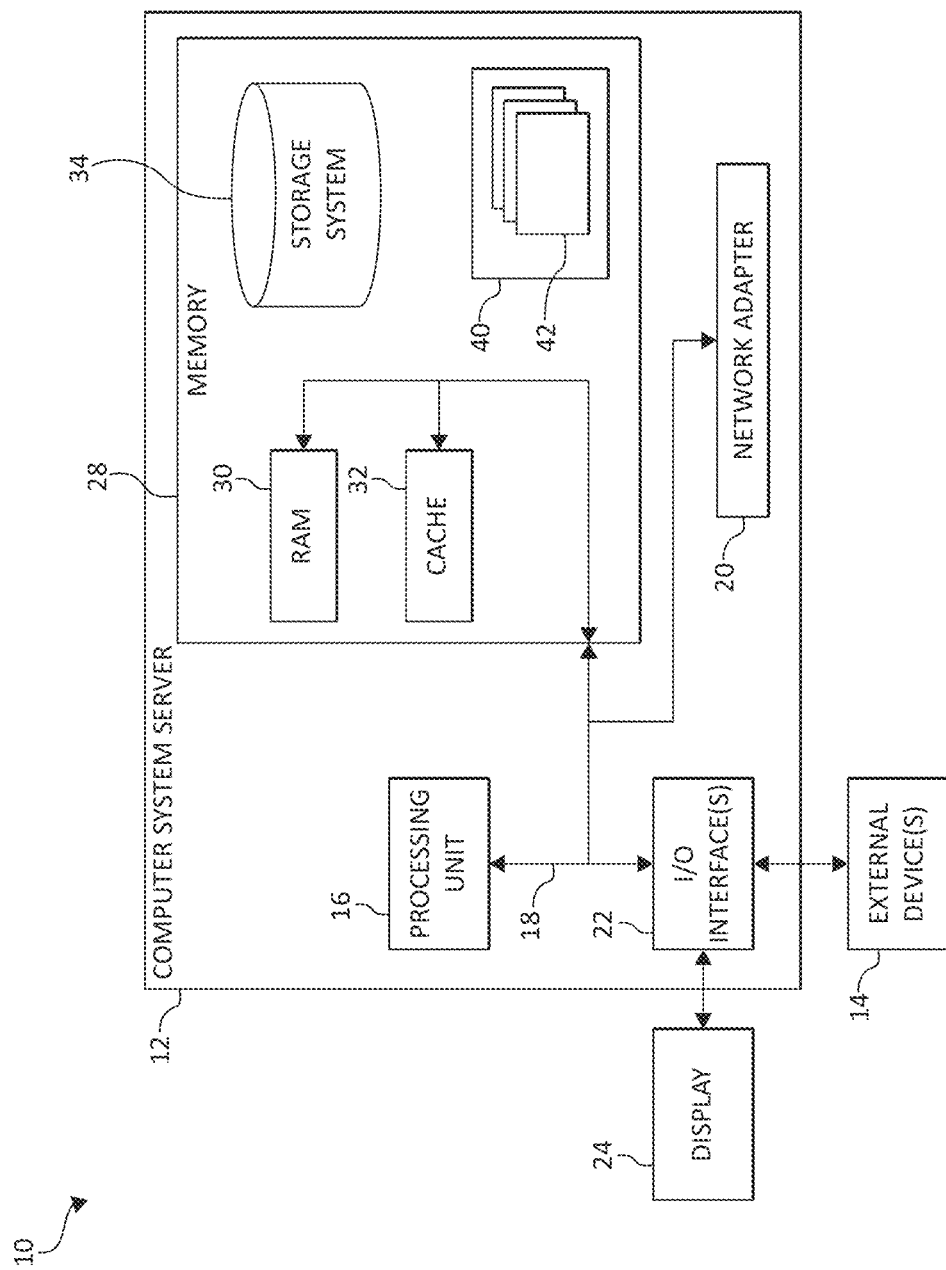
FIG. 1 is a block diagram depicting an exemplary computing node, according to embodiments of the present invention.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
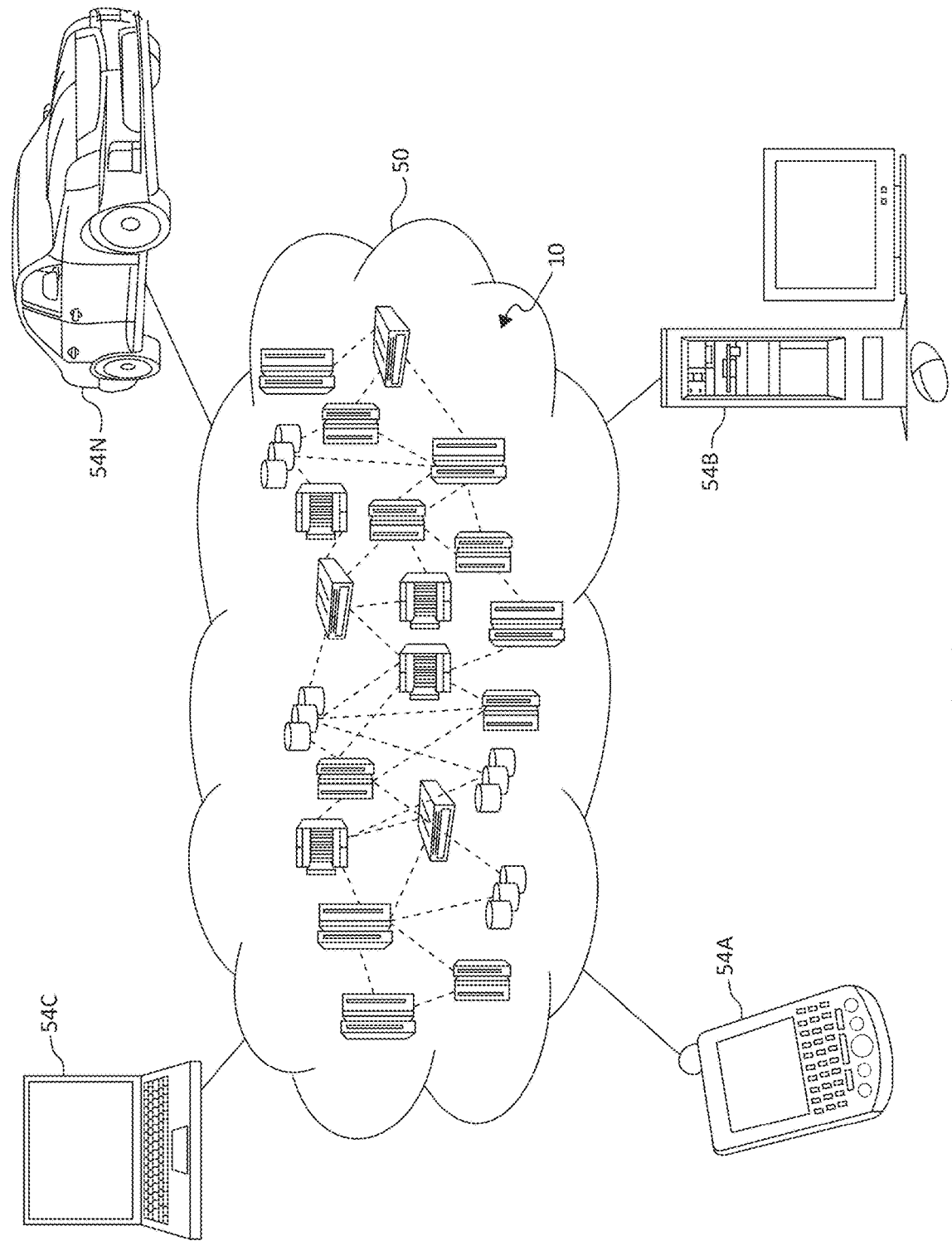
FIG. 2 is a block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
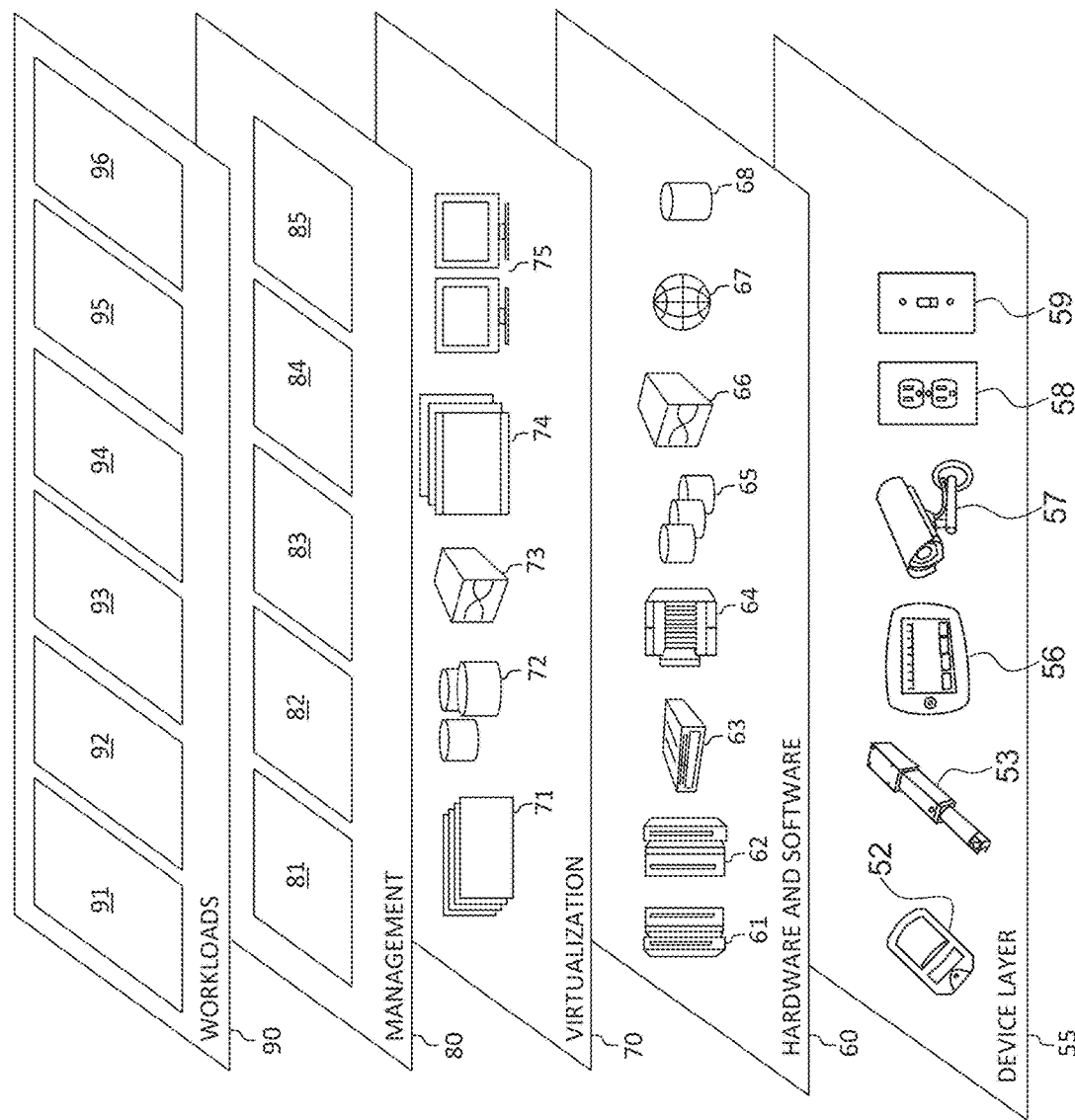
FIG. 3 is a block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various cloud budget analyzation and optimization functions 96. One of ordinary skill in the art will appreciate that the cloud budget analyzation and optimization functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Computing and Implementing Budgets Utilizing A Cloud Bursting Mechanism

Figure 4:
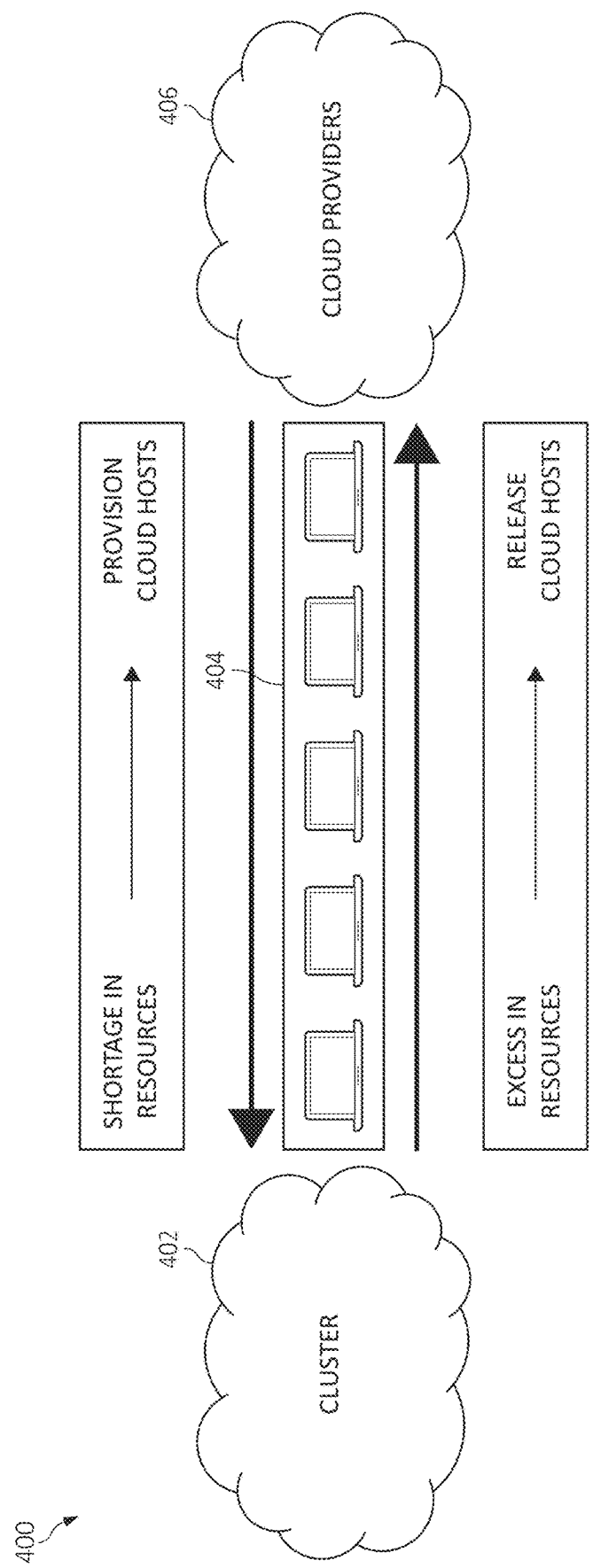
FIG. 4 is a block diagram depicting a cloud bursting mechanism, according to embodiments of the present invention.

Cloud bursting is the operation of offloading workloads from local hosts to cloud hosts. Essentially, when workload resource demand exceeds the capacity of resources in a local cluster, additional cloud hosts are provisioned and added to the cluster to meet the resource demand. When there is excess capacity in allocated cloud hosts, this excess capacity is released to the cloud providers. This process is illustrated in the cloud bursting mechanism 400 of FIG. 4, where a cluster 402 (e.g., a hybrid cluster of local resources and remotely provisioned resources) is provisioned or allocated cloud hosts 404 from cloud providers 406 upon encountering workloads demanding more resources than the cluster 402 can provide, and similarly, the cloud hosts 404 are released from the cluster 402 back to the cloud providers 406 subsequent to the workload demand being satisfied. It should be noted that the present disclosure refers to cloud hosts generally as reference 404. In respective implementations, these cloud hosts 404 may comprise hosts which are currently allocated to the cluster 402, hosts which are requested from cloud providers 406 but not yet allocated to the cluster 402, or hosts that were previously allocated to the cluster 402 which are now released back to the cloud providers 406.

The cloud bursting capability provides several benefits. Cost savings is one of the prominent benefits. Rather than spend the money to build and maintain infrastructure to accommodate spikes in resource usage that occur only occasionally, the cloud bursting environment enables the offload of workloads from the local infrastructure (cluster 402) to cloud hosts 404, and therefore the additional infrastructure is paid for only when it is needed, thereby reducing the total cost of ownership. Another benefit is the flexibility to use multiple cloud providers 406 (e.g., different companies) and different types of infrastructures and resources, depending on considerations such as workload requirements and cost. Improved security is an additional benefit. Cloud providers 406 can offer increased security, isolation of servers, and communication over a private network. Combining local and cloud resources can utilize this functionality to address security and compliance aspects for their workloads. Finally, among other benefits, the cloud bursting environment provides scalability by extending the cluster 402 dynamically to cloud providers 406. In addition, by leveraging resources of cloud providers 406 using the cloud bursting mechanism 400, the exposure to outages and downtime can be mitigated.

In the cloud bursting environment, there are several problems related to meeting budget constraints, as cloud resources are inherently (monetarily) expensive. Organizations utilizing these types of systems generally have predetermined budget limits for a defined duration of time (e.g., monthly or annually). Further complicating matters is that the overall organizational budget may be divided and shared among functional units. These budget limits may be hard limits (that cannot be exceeded) or soft limits (that can be exceeded and/or carried over). Efficiently utilizing the allocated cloud budget is a challenging problem for organizations, with one key element being there currently is no reliable way to calculate a remaining budget at any instant in time. That is, given a budget for the defined duration of time (e.g., a month), at any given instant in time within the month there is currently no optimized solution to determine what budget amount remains for the duration of the month. In this way, it is difficult to plan allocations for the remaining portion of the defined duration of time so as to most optimally utilize resource allocations within the budget limit(s). Further, commensurate with computing the remaining available budget for the defined duration of time, an additional challenge is selecting an optimal combination of cloud resources (both in terms of quantity and quality of those resources) within hard and/or soft budget constraints. In other words, for cloud resources rented by the cloud providers 406 as bundles having different types, quantities, and qualities of resources, utilizing the budget constraints to most efficiently choose the best combination of resource bundle(s) within those constraints can be a prohibitive task.

In existing commercial cloud bursting implementations, an administrator is heavily relied upon to identify the shortage or excess of resources within the cluster 402. Moreover, the administrator is relied upon to monitor budget spending for cloud resources utilizing monitoring tools (e.g., applications), and trigger the provisioning and release of cloud hosts 404 from the cloud providers 406 to the cluster 402 while staying within the stipulated budget limits. While some existing literature has addressed aspects of these challenges, existing techniques typically require budget distribution at an application level and down to the job and task level. Because of this, the existing solutions do not address cloud budgeting at an organizational or functional unit level where the budget may apply to cloud resource usage for a defined duration irrespective of the applications utilizing the cloud resources. Further, these existing implementations typically focus on the application and scheduling of application tasks with a goal of minimizing the application completion time within the application budget constraints. Therefore, these techniques do not address the challenges faced by cluster administrators with respect to reigning in cloud utilization to meet budget constraints at a higher level.

Accordingly, the present invention considers novel techniques to dynamically compute, determine, and select the best possible resources and combinations of resource bundles for allocation (i.e., renting) while simultaneously doing so with regard to cost and budget constraints, such that the cluster 402 may be enabled to automatically provision the most optimal cloud hosts 404 and/or resources from cloud providers 406 during a cloud burst operation.

Figure 5:
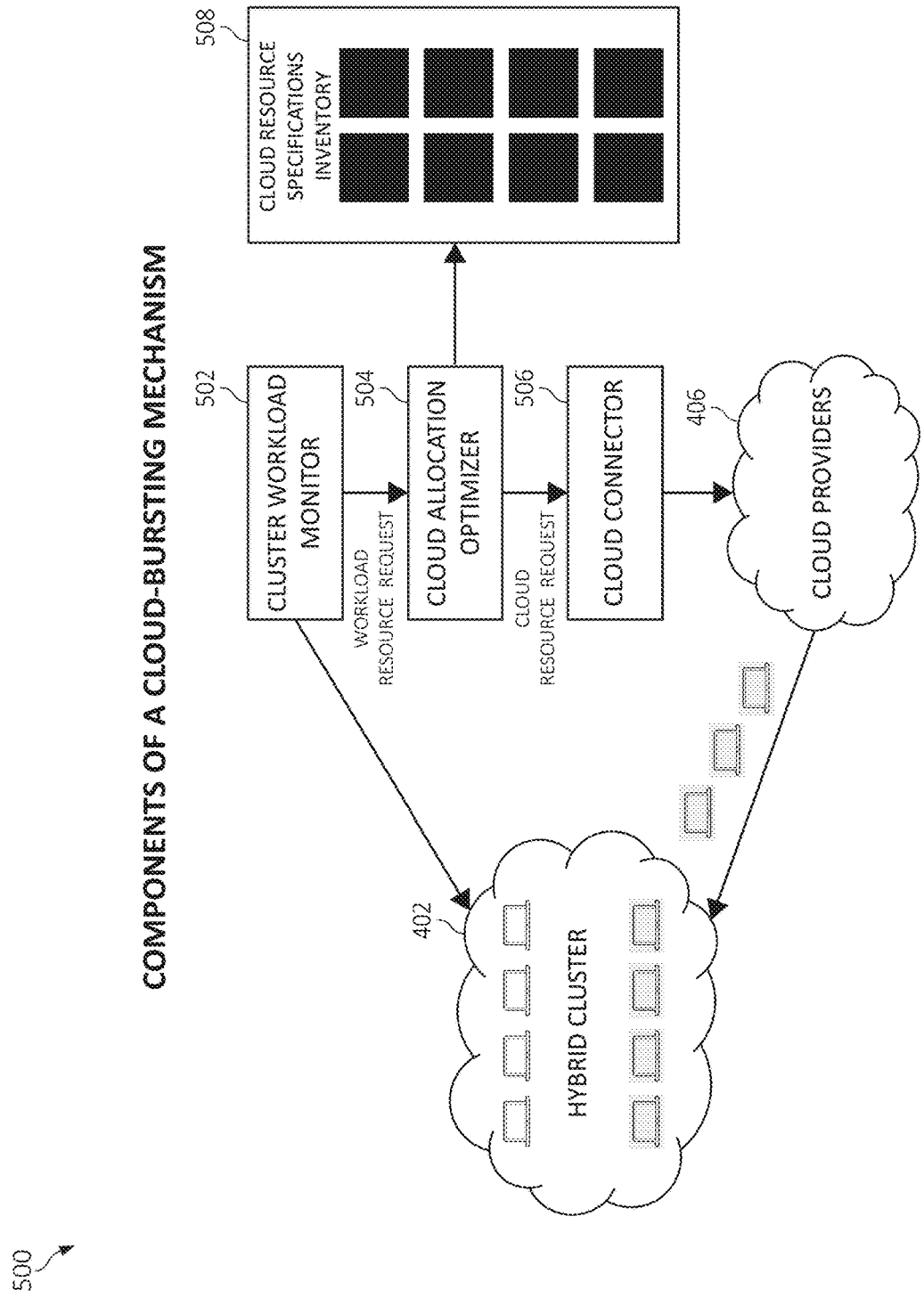
FIG. 5 is a block diagram depicting a system overview of a cloud bursting mechanism, according to embodiments of the present invention.

In conjunction with these techniques, several functional components are considered, including the cloud bursting mechanism 400 which is typically composed of various elements as illustrated in the components 500 of the cloud bursting mechanism 400, in FIG. 5. The components 500 may include the (hybrid) cluster 402 and cloud providers 406, which as aforementioned, provision and release cloud hosts 404 therebetween to enable the execution of a high-demand workload. The components 500 may additionally include a cluster workload monitor 502 which monitors the workload in the cluster 402 and generates cloud resource requests required to meet the workload SLA. A cloud allocation optimizer 504 may be included, which aggregates and optimizes all cloud resource requests triggered by the cluster workload monitor 502. The cloud allocation optimizer 504 may function to optimize and regulate cloud usage to satisfy resource and budget constraints for the cluster 402. Further, the components 500 may include a cloud connector 506, which connects with external cloud providers 406 using cloud provider application programming interfaces (APIs) to trigger resource provisioning on the cloud.

In embodiments particular to the functionality described in the present disclosure, the components 500 may additionally include a cloud resource specification inventory 508. The cloud resource specification inventory 508 includes an inventory of specifications of cloud resource bundles available for provisioning from the cloud providers 406. That is, the inventory can include a full set or a subset of offerings from cloud providers 406. It should be noted that the 'resource bundle' (or combinations thereof) include those offerings from cloud providers 406 of various 'bundled' resources for renting over a given time period. That is, a bundle (or combination of bundles) may include processors, cores, memory, storage, networking devices, graphical processing devices, etc. in various assortments available for provisioning workloads thereon.

Figure 6A:
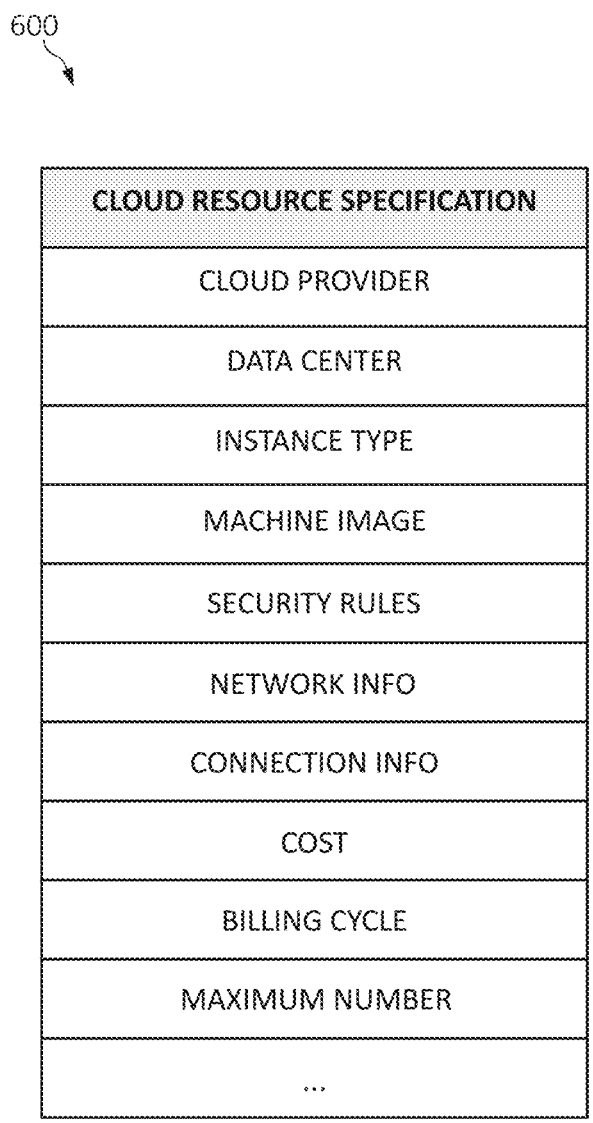
FIG. 6A is a block diagram depicting attributes of a cloud resource specification utilized in initiating a cloud resource request, according to embodiments of the present invention.

Each cloud resource specification includes details of various characteristics related to a resource(s) provided by cloud providers 406. The cloud resource specification 600 of FIG. 6A illustrates that this information may include a cloud provider, a data center (i.e., a physical location and other identifying information thereof), an instance type, a machine image, security information, set rules, network information, connection information, a cost and billing cycle, etc.

Figure 6B:
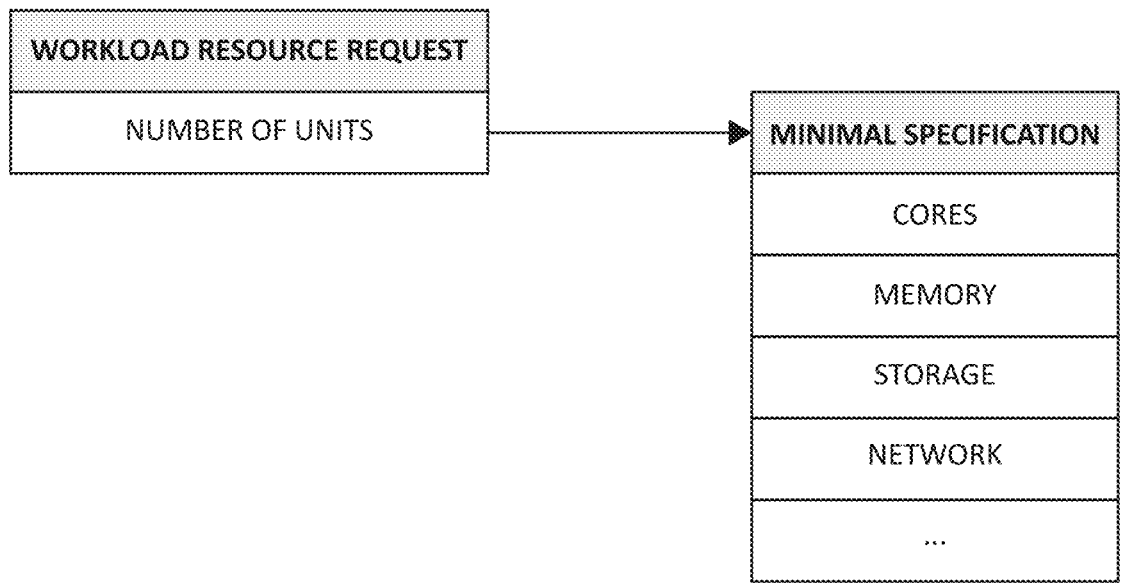
FIGS. 6B-6C are block diagrams depicting a workload resource request and a cloud resource request, respectively, according to embodiments of the present invention.

When initiating an operation to allocate certain cloud hosts 404 for provisioning to the cluster 402, a workload resource request 625 is first generated based on the requirements of the particular application, as illustrated in FIG. 6B. In various embodiments, the cluster workload monitor 502 monitors the workload in the cluster and generates resource scale-out requests required to meet the workload SLA. Depending on the characteristics of the given workload (such as compute intensive, memory intensive or balanced), the minimum set of resources required for the given workload task to run may differ from the minimum set of resources required for a task of another workload. The minimal set of resources includes one or more resource types such as compute (processors), memory, storage, network bandwidth etc. A resource scale-out request for a workload can be expressed as depicted in the workload resource request 625, where a certain number of units with a minimal resource specification is requested. The workload resource requests are then queued in the incoming workload resource request queue 702 which will be later described in FIG. 7.

Figure 6C:
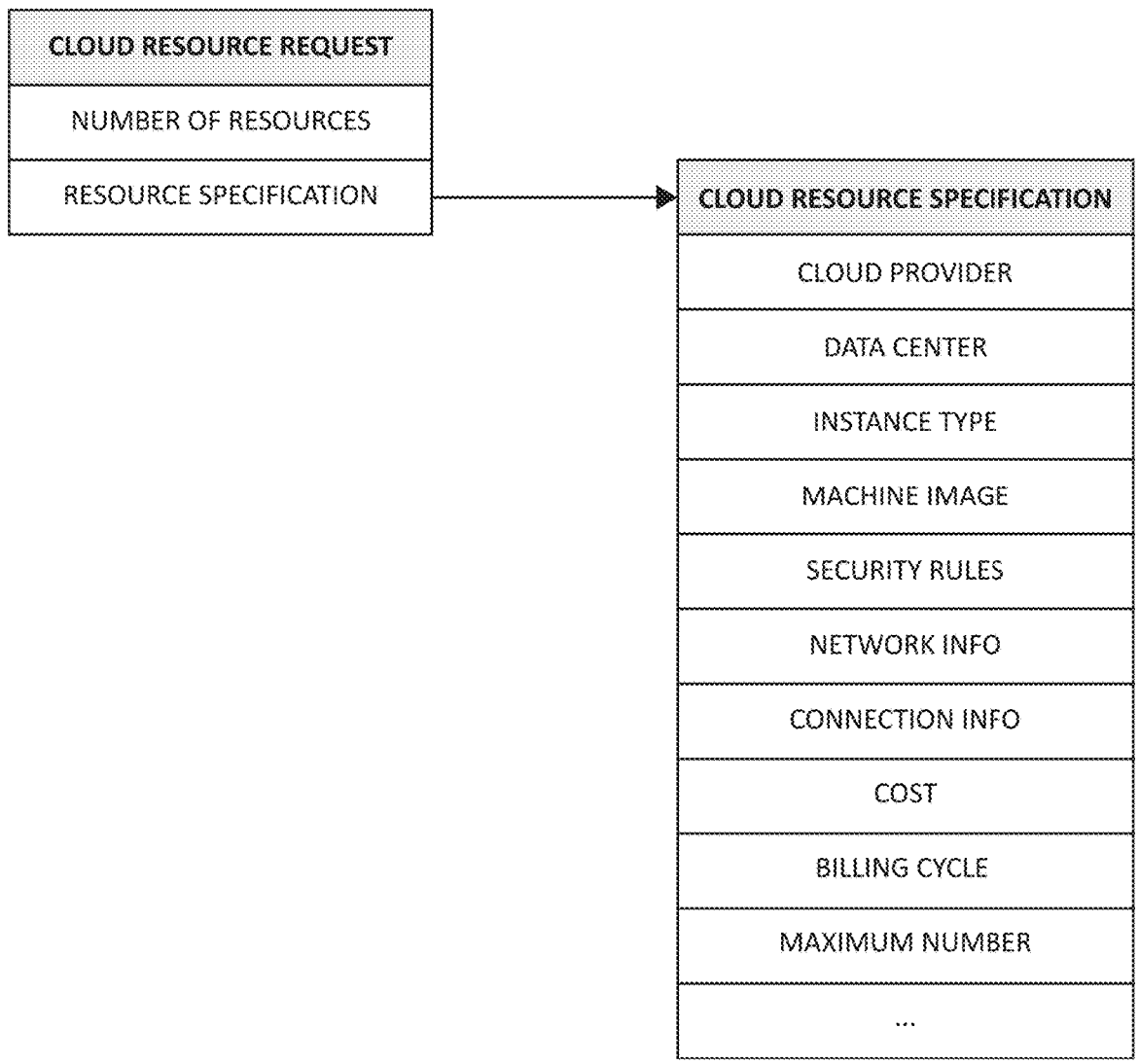

To translate the workload resource request 625 into processes that are ultimately enabled to provision resources from the cloud providers 406, a cloud resource request 650 is generated, as illustrated in FIG. 6C. The workload resource requirement expressed as shown in the workload resource request 625 is a generic format for identifying resources. It cannot be used as-is for cloud provisioning because the cloud providers 406 vary with respect to the way resource bundling is handled. Therefore, a provisioning request from the cloud is generally of the form depicted in the cloud resource request 650. The cloud resource request 650 typically includes such information as the cloud provider name and the number of resources of a specific resource bundle requested.

Figure 7:
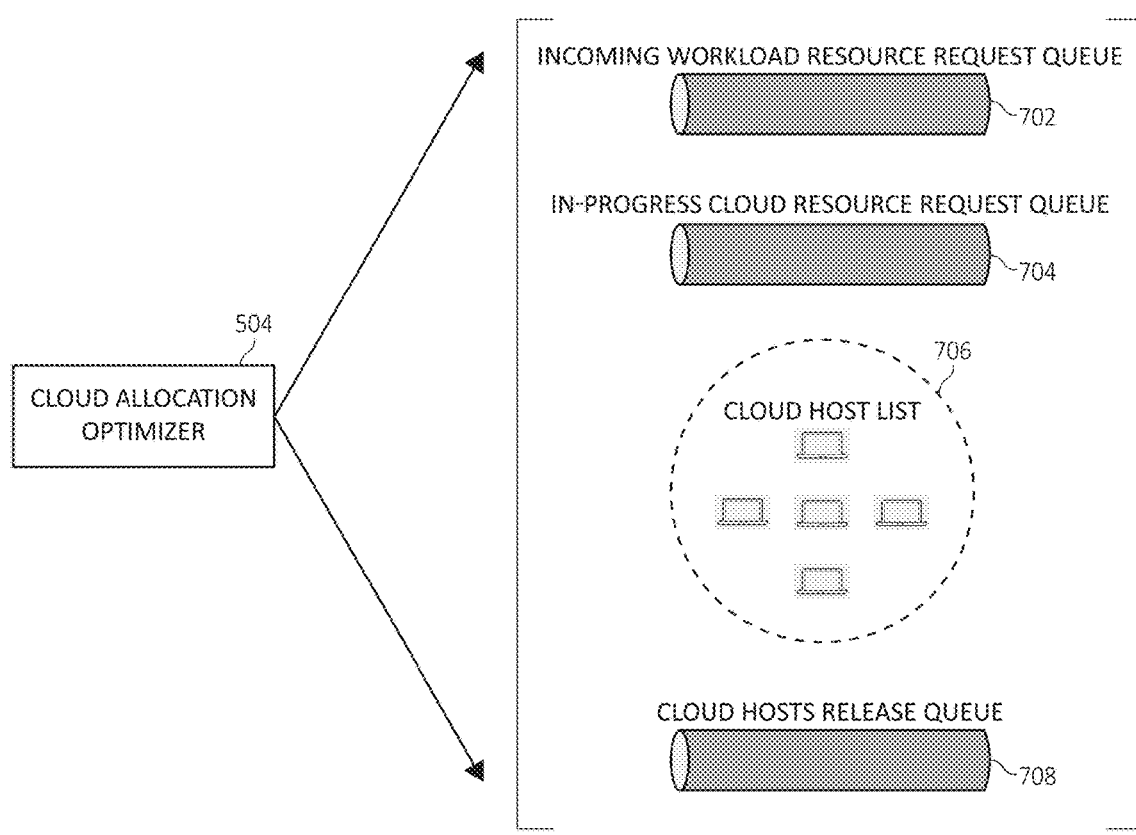
FIG. 7 is a block diagram depicting data structures for monitoring cloud activity in a cluster, according to embodiments of the present invention.

Turning now to FIG. 7, the cloud allocation optimizer 504 may be part of a generic system implementing cloud bursting functionality having various data structures 700 maintained for tracking and monitoring cloud activity in the cluster 402. These data structures 700 may include, within the cloud allocation optimizer 504, an incoming cloud requests queue 702 which maintains a queued list of incoming cloud resource requests in the cluster 402. The data structures 700 may include an in-progress cloud request queue 704 of all cloud resource requests currently in-progress in the cluster 402. The data structures 700 may further include a cloud host list 706 of all cloud hosts 404 that are currently allocated to the cluster 402. Finally, the data structures 700 may additionally include a cloud hosts release queue 708 of cloud hosts which are to be released within a given time interval from the cluster 402. Of course, the skilled artisan will recognize that additional or fewer data structures may be present in a given specific implementation, and that the number of data structures 700 given in FIG. 6 are provided only for illustrative convenience.

According to some embodiments, various types of constraints within the cloud bursting environment are considered, including both resource constraints and budget constraints. When considering the resource constraints, a global or overall resource limit may be enforced. This global or overall resource limit may implement a limit on the maximum number of cloud hosts 404 that can be provisioned at any given instant in time. In another aspect, a local/fine-grained resource limit may be enforced. This local resource limit may apply to specific types of cloud resources, and limit the maximum number of cloud hosts of a specific type that can be provisioned at any given instant in time.

The budget constraints may be implemented on a variety of levels. For example, coarse-grained budget limits may be enforced on an organizational or functional unit level. Fine-grained budget limits may, on the other hand, be enforced at an application level. Further, the budget limits may be of differing types. One type of budget limit is a hard limit, which is a budget allotment that cannot be exceeded. Another type of budget limit is a soft limit, which may (in some situations) be exceeded up to a 'budget carry-over' limit, for example.

Figure 8:
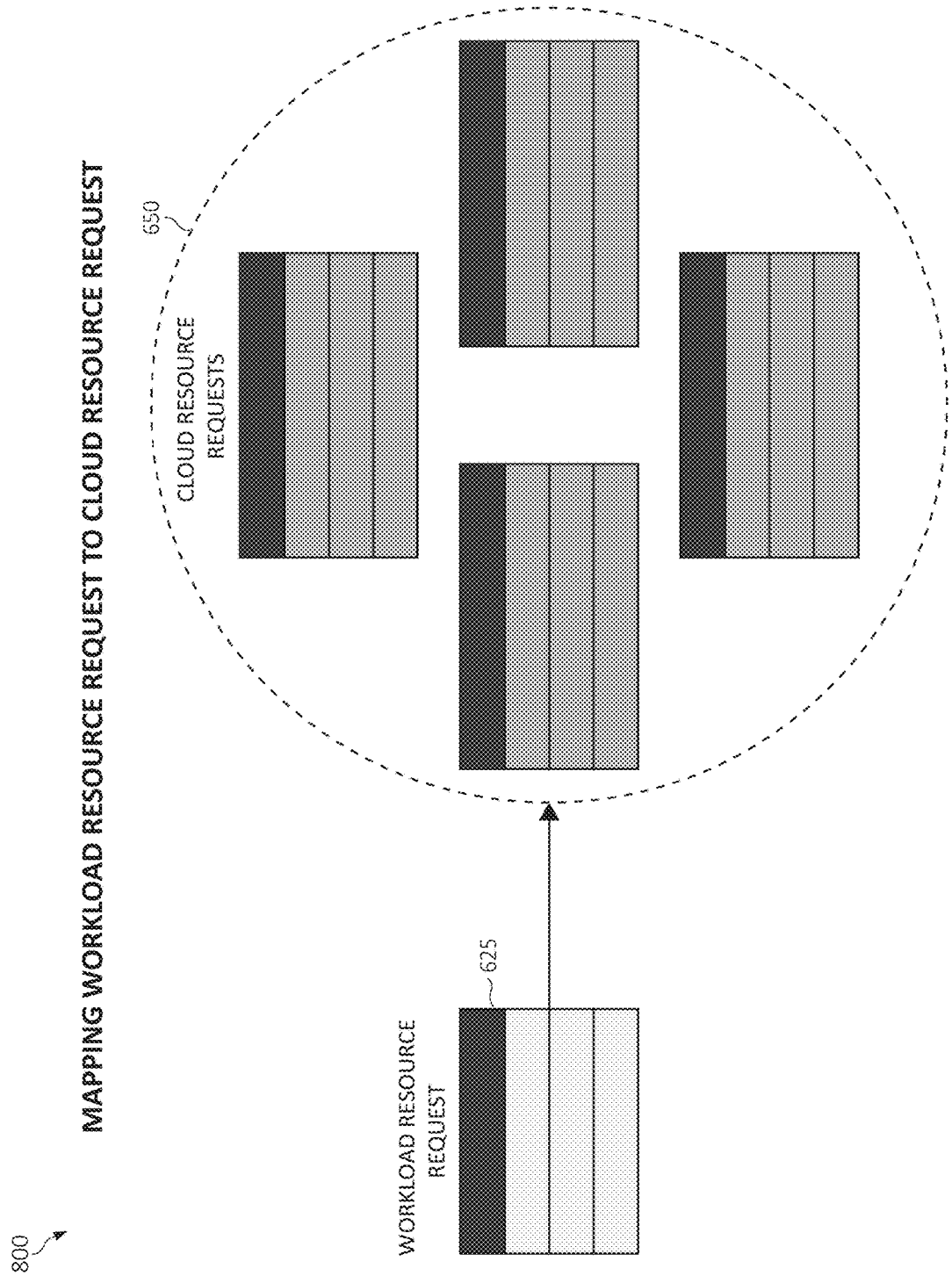
FIG. 8 is a block diagram depicting a mapping of workload resource requests to cloud resource requests, according to embodiments of the present invention.

In connection with various functionality described in the present disclosure, the following definitions are provided:
BudgetTimeWindow: A defined budget time interval, window or period (e.g., monthly, annually)
ElapsedTime: An elapsed time since the start of the current BudgetTimeWindow
RemainingTime: The excess of BudgetTimeWindow over ElapsedTime
BudgetLimit: An overall budget limit for BudgetTimeWindow
BudgetThresholdLimit: A budget threshold limit beyond which the system needs to carefully regulate the usage of the remaining budget to prevent overshooting the budget limit
RemainingBudgetSafeEstimate: A computed remaining budget that can be safely utilized to service incoming cloud resource scale-our requests without overshooting the budget limit.
BudgetOverflowLimit: Allowable budget overflow amount over the BudgetLimit for the BudgetTimeWindow Algorithm for Selecting an Optimal Combination of Cloud Resources within Budget Constraints With the foregoing definitions in view, an algorithm is now considered for computing an optimal combination of cloud resources for selection to provision to the cluster 402 (while complying with set or expected budget limits), as presented by the cloud providers 406. To trigger resource provisioning from the cloud, cloud allocation optimizer 504 must map a workload resource request 625 into a combination of cloud resource requests 650 to one or more cloud providers 406, as depicted in the request mapping 800 of FIG. 8. That is, as aforementioned, the cloud allocation optimizer 504 must translate the specifications outlined in the workload resource request 625 to the cloud resource request 650 which is generic to a given cloud provider 406. The cloud resource specification inventory 508 contains information on the various cloud resource bundles available for provisioning from cloud providers 406, including the maximum number of instances, their cost and detailed resource specifications thereof.

When selecting a particular combination of resources available from the cloud provider 406, the challenge is to select a combination of resource bundles that: a) satisfies minimum workload constraints (a hard constraint); b) satisfies budget constraints (which may be hard or soft constraints); c) satisfies the workload's demand for resources (which may be hard or soft constraints); and d) has a high 'level of goodness'. In the context of the present disclosure, the level of goodness of the resources comprises an aggregate of various aspects of types of resources, their known quality, quantity and locality, and other characteristics as will be further qualified following.

Figure 9:
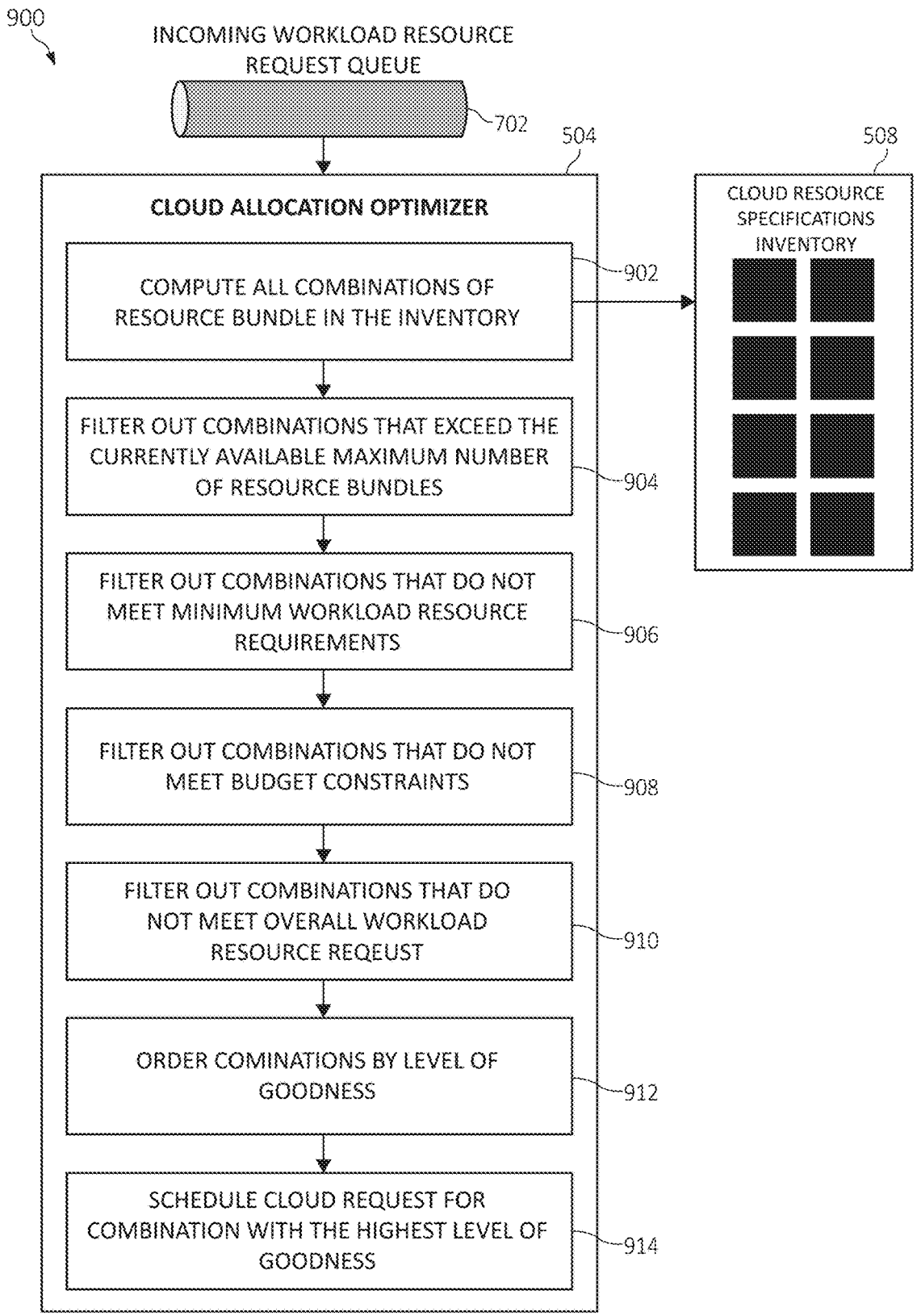
FIG. 9 is a combination flowchart/block diagram depicting a selection process to select an optimal combination of cloud resource bundles, according to embodiments of the present invention.

Referring now to the algorithm 900 illustrated in FIG. 9 for selecting the optimal combination of resources, the cloud allocation optimizer 504 may use the algorithm 900 to perform the following procedure. In step 902, the cloud allocation optimizer 504 computes all combinations of cloud resource bundles up to the absolute maximum number of instances (i.e., N1, N2 or N3 in a tuple 1000 of FIG. 10) of the cloud provider 406, and/or a predefined number. This is a one-time computation where all possible combinations are computed by assigning a number from 0 and up to the maximum number of instances of the resource bundles, where the assigned number indicates the number of instances to allocate. The combination may be expressed as the combination tuple 1000, as illustrated in FIG. 10. For example, a tuple $<A_1, A_2, A_3>$ implies that $A_1$ instances of $R_1$, $A_2$ instances of $R_2$ and $A_3$ instances of $R_3$ will be allocated for this combination.

Returning back to the algorithm 900 of FIG. 9, in step 904, the cloud allocation optimizer 504 filters out all combinations that exceed the number of instances currently available for the resource bundles. This is performed by filtering out any combination that includes at least one resource bundle whose number of instances to allocate exceeds the current available maximum (i.e., $M_1$, $M_2$ or $M_3$ in the tuple 1000 of FIG. 10).

Subsequent to filtering out all combinations that exceed the number of instances currently available, the cloud allocation optimizer 504 then, in step 906, filters out all combinations that do not meet the minimum workload resource requirement specified in the workload resource request 625. This is performed by filtering out any combination that includes at least one resource bundle whose specification includes at least one sub-resource amount which is smaller than the corresponding amount in the minimum workload resource requirement. For example, if the minimum workload resource requirement specifies 4 processor cores and resource bundle $R_1$, $R_2$, and $R_3$ has 2, 4 and 8 cores respectively, then any combination that includes resource bundle $R_1$ is excluded. Thus, when performing steps 904 and 906 (i.e., both filtering steps), the cloud allocation optimizer 504 ensures that only resource bundle combinations that meet the hard requirements of the resource request remain for consideration.

Next, in step 908, budget constraints (either soft or hard constraints) are taken into consideration by the cloud allocation optimizer 504. In some embodiments, the cloud allocation optimizer 504 first computes the total cost of each resource bundle combination, and sorts the combinations according to their respective total cost. If the budget constraints are hard set, the cloud allocation optimizer 504 then filters out combinations whose total cost exceeds the remaining safe budget (i.e., the RemainingBudgetSafeEstimate) as computed for the time window. Conversely, if the budget constraints are soft, the cloud allocation optimizer 504 filters out combinations whose total cost exceeds the sum of the remaining safe budget and the budget overflow limit (i.e., the RemainingBudgetSafeEstimate+BudgetOverflowLimit). If the filtering, whether by considering hard or soft budget constraints, results in an empty set of combinations, the cloud allocation optimizer 504 does not provision any cloud resources from cloud providers 506.

If, after filtering for budget constraints, resource bundle combinations still remain, the cloud allocation optimizer

504 then determines those combinations that satisfy the overall workload demand for resources in step 910. In terms of constraints for an overall workload demand for resources, a hard constraint requires that the workload's demand for resources must be fully satisfied, and a soft constraint means that the workload's demand for resource can be partially satisfied. To perform filtering according to workload resource constraints, the cloud allocation optimizer 504 divides the set of remaining combinations (subsequent to the previous filtering) into two subsets. These two subsets include a first subset which is a list of resource bundle combinations that fully satisfy the overall workload demand for resources, and a second subset which is a list of resource bundle combinations that partially satisfies the overall demand for resources.

Upon separating the set of resource bundle combinations into the two subsets, if the workload resource demand constraint is hard and the first subset is empty (i.e., there are no remaining combinations which can fully satisfy the overall workload demand for resources), the cloud allocation optimizer 504 does not provision any cloud resources from cloud providers 506. If there are combinations listed, however, in the first subset which satisfy the overall workload demand for resources, these combinations are then ordered by their respective level of goodness—the process of which will be defined following.

Conversely, if the workload resource demand constraint is soft, then again the combinations listed in the first subset (assuming there are combinations remaining) are ordered by their respective level of goodness. If the first subset is empty, however, the second subset—which comprises those resource combinations which partially satisfy the overall workload demand for resources—are ordered by their respective level of goodness.

Depending on the workload resource demand constraint (soft or hard) and which subset of resource bundle combinations remains with possible candidates, the cloud allocation optimizer orders the first and/or second subset by each combination's respective level of goodness at step 912. The level of goodness for a combination of cloud resource bundles can be defined based on several aspects such as a) compute power; b) cost; and c) distribution/co-location of resources and their relative desirability for a customer. For every resource bundle combination, scores are assigned for each aspect as now described.

Compute power: Encompasses the processing power of a given resource bundle. The compute power can include several sub-aspects such as a) a number of processor cores provided; b) memory provided; c) storage provided; d) network bandwidth provided; and e) an I/O capacity provided. For each sub-aspect, a score between 0 and 1 is calculated and assigned per combination. A larger value for the sub-aspects is desirable, so for computing the scores, the maximum value of the particular sub-aspect among all the combinations is considered. For example, to compute a score for the processor cores sub-aspect, the total number of cores in a combination is divided by the maximum value of total number of cores among all feasible resource bundle combinations.

Cost: Total cost incurred for a specific combination of resource bundles for a normalized billing interval (e.g., hourly). The total cost is computed by aggregating the cost of all the individual resource bundles in the combination, and can be expressed as:

$$\text{Total Cost} = \Sigma_{k=1}^{k=n} A_k * C_k$$

Cost Score: Every combination is assigned a cost score between 0 and 1. To calculate the cost score, the cost of the current combination is compared to the minimum cost of all the feasible combinations subsequent to the filtering of step 908. A score of 1 is assigned for the combination with minimum cost, since low cost is desirable. The cost score of other combinations is calculated by dividing the minimum cost by the cost of the current combination. Expensive combinations are thereby assigned lower scores.

Distribution/Colocation: Distribution of resource bundles in the resource bundle combination includes several sub-aspects such as a) a total number of resource bundles; b) a number of distinct resource bundles; c) a number of distinct reliability zones; and d) a number of distinct cloud providers. Large number of resource bundles spread across multiple reliability zones (i.e., in different physical locations) and cloud providers implies a high level of distribution. This may be a desirable aspect for some customers whereas others may prefer a low distribution with more co-located resources. Every sub aspect is assigned a 'high distribution score' as well as a 'low distribution score' between 0 and 1.

High distribution score: For each sub-aspect, the resource bundle combination with the maximum value is assigned a score of 1, and the combination with minimum value is assigned a score of 0. The score of other combinations is calculated by dividing the corresponding sub-aspect value of the current combination by the maximum value of the sub-aspect among the combinations.

Low distribution score: For each sub-aspect, the resource bundle combination with the minimum value is assigned a score of 1, and the combination with maximum value is assigned a score of 0. The score of other combinations here is similarly calculated by dividing the corresponding sub-aspect value of the current combination by the minimum value of the sub-aspect among the combinations.

To express the desirability of the various aspects and sub-aspects mentioned previously, a customer or user may assign weights globally to all the sub-aspects such that their weights sum up to 1. In other embodiments, the customer may assign weights to the high-level aspects and then assign weights to the sub-aspects such that at each level the weights add up to 1. The level of goodness is then computed as a weighted aggregation of all the scores. The combination of resource bundles with the highest value for the level of goodness is therefore identified as the optimal combination. If weights are not provided, the system may use default weights.

Upon determining a score for each sub-aspect (i.e., from 0 to 1 for each characteristic), a score assignment table 1100 is generated for all remaining combinations of resource bundles, as illustrated in FIG. 11. The table 1100 includes the combination tuple 1000 and a scoring assignment for each sub-aspect as described, and is used to select the most optimal resource combination according to its respective level of goodness according to the aggregate of each sub-aspect scored. Thus, returning to the method 900, the cloud allocation optimizer 504, in a final step 914, selects the optimal combination and generates a cloud resource request 650 according to the combination having the highest score.

Figure 12:
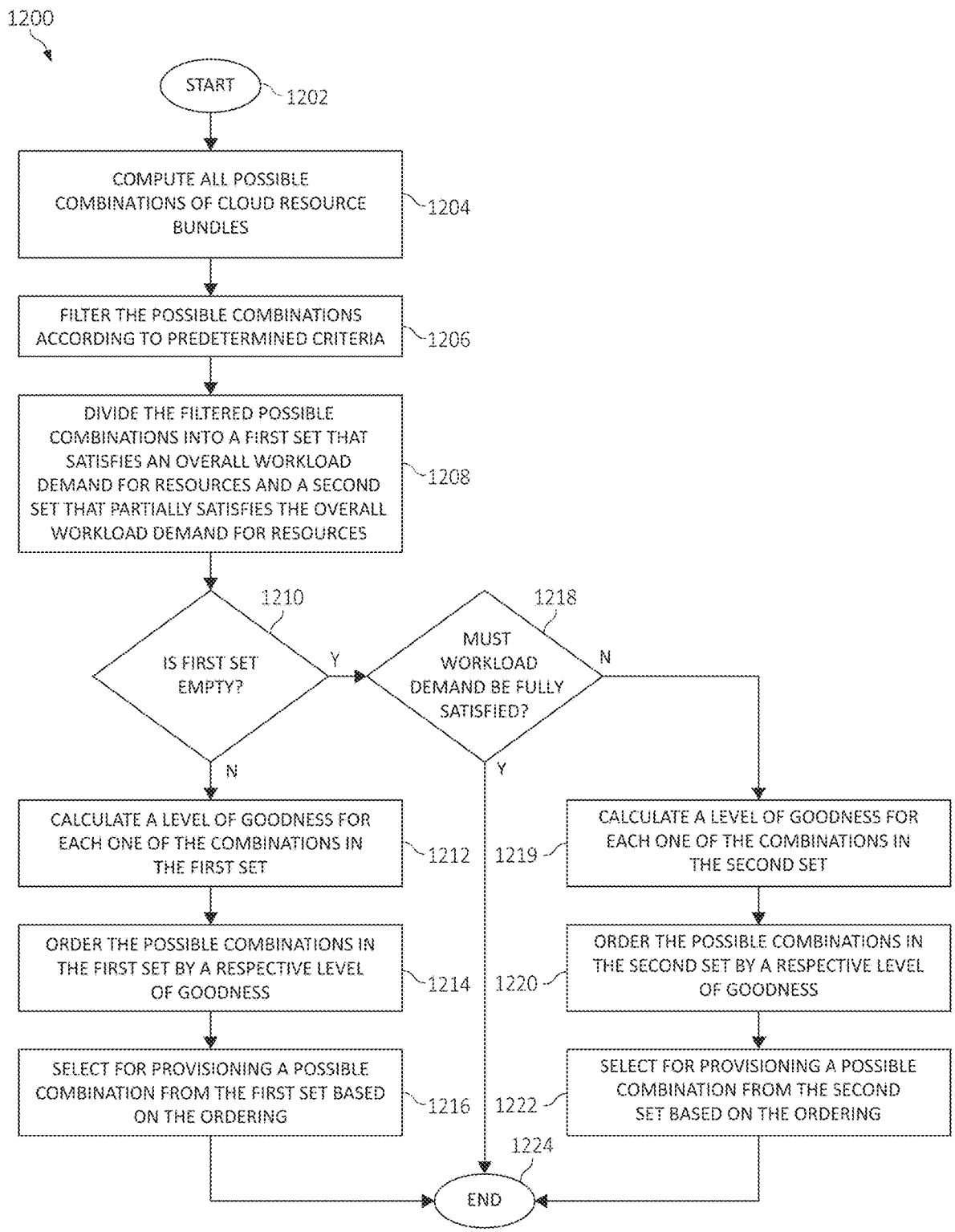
FIG. 12 is a flowchart diagram depicting a computer-implemented method for selecting an optimal combination of cloud resources within budget constraints, according to embodiments of the present invention.

Turning now to FIG. 12, a method 1200 for selecting an optimal combination of cloud resources within budget constraints is depicted, in which various aspects of the illustrated embodiments may be implemented. The functionality of the method 1200 may be executed as instructions on a machine, where the instructions are embodied on a tangible, non-transitory machine-readable storage medium. The method 1200 begins at step 1202. In some embodiments, all possible combinations for cloud resource bundles are computed (step 1204). The possible combinations are then filtered according to predetermined criteria, as described in the algorithm 900 (step 1206). The filtered possible combinations are divided into a first set that satisfies an overall workload demand for resources, and a second set that partially satisfies the overall workload demand for resources (step 1208). A determination is then made as to whether the first set is empty (step 1210). If, at step 1210, the first set is empty, another determination is made as to whether the overall workload demand must be fully satisfied (step 1218). If the overall workload demand must be fully satisfied to continue, the method 1200 ends (step 1224).

Returning to step 1210, if it is determined that the first set is not empty, a level of goodness for each one of the combinations in the first set is calculated (step 1212). The possible combinations of the first set are then ordered by their respective level of goodness (step 1214), and a selection is made for provisioning from the ordered list of the combinations of the first set (step 1216). The selection includes the combination having the highest level of goodness relative to all other combinations in the first set. The method 1200 then ends (step 1224).

Returning to step 1210, if it is determined that the first set is empty, and it is further determined at step 1218 that the overall workload demand is not required to be fully satisfied, a level of goodness for each one of the combinations in the second set is calculated (step 1219). The possible combinations of the second set are then ordered by their respective level of goodness (step 1219), and a selection is made for provisioning from the ordered list of the combinations of the second set (step 1222). The selection includes the combination having the highest level of goodness relative to all other combinations in the second set. The method 1200 then ends (step 1224).

In some embodiments, and in conjunction with the method 1200, for each cloud resource bundle, at least one of the following attributes is configured:
a maximum number of instances allowed for allocation,
a cost of an instance,
a number of instances currently available for allocation, and
a number of instances to be allocated in a specific combination of resource bundles.

In some embodiments, and in conjunction with the method 1200, the resource bundle combinations are calculated by assigning allocation values for each one of the resource bundles, wherein an allocation value for a resource bundle ranges from zero to the maximum number of instances allowed for allocation for that resource bundle, and the allocation value for a resource bundle indicates the number of instances to allocate of that resource bundle.

In some embodiments, and in conjunction with the method 1200, filtering combinations includes at least one of:
filtering combinations that include at least one resource bundle whose number of instances to allocate exceeds the number of instances currently available for allocation for the resource bundle, and
filtering combinations that include at least one resource bundle whose specification includes at least one sub resource amount which is smaller than a corresponding amount in a minimum workload resource requirement.

In some embodiments, and in conjunction with the method 1200, filtering combinations further includes at least one of:
computing the total cost of each one of the combinations,
sorting the combinations by their total cost,
filtering combinations whose cost exceeds a remaining safe budget for cloud resource allocation, if an input budget constraint is hard,
filtering combinations whose cost exceeds the sum of the remaining safe budget and a budget overflow limit, if the budget constraint is soft, and
not provisioning cloud resources if the filtering results in an empty set of combinations.

In some embodiments, and in conjunction with the method 1200, filtering combinations further includes at least one of:
dividing the set of remaining combinations into 2 sets: a first set that satisfies an overall workload demand for resources, and a second set that partially satisfies the overall workload demand for resources,
not provisioning cloud resources, if the overall workload demand for resources must be fully satisfied and the first set is empty,
provisioning cloud resources from the first set, if the overall workload demand for resources can be partially satisfied and the first set is not empty, and
provisioning cloud resources from the second set, if the overall workload demand for resources can be partially satisfied and the first set is empty.

In some embodiments, and in conjunction with the method 1200, the level of goodness is defined of a combination of cloud resource bundles by calculating and aggregating scores of at least one of the following aspects:
a compute power,
a cost, and
a distribution or co-location of resources.

In some embodiments, and in conjunction with the method 1200, a score is calculated for the compute power aspect by at least one of:
configuring sub-aspects that include at least one of: CPU cores, memory, storage, network bandwidth, I/O capacity, and
calculating a compute power score between 0 and 1 for each sub-aspect.

In some embodiments, and in conjunction with the method 1200, a score is calculated for the cost aspect by at least one of:
calculating an aggregated cost of all individual resource bundles in the combination,
comparing the aggregated cost of the current combination with the minimum cost of all the feasible combinations,
dividing the minimum cost by the cost of the current combination,
calculating a cost score between 0 and 1 for the current combination, and
assigning a cost score of 1 to the combination with minimum cost.

In some embodiments, and in conjunction with the method 1200, a score is calculated for the distribution aspect by at least one of:
configuring sub-aspects that include at least one of: total number of resource bundles, number of distinct resource bundles, number of distinct reliability zones, number of distinct cloud providers,
calculating for each sub-aspect a high distribution score by assigning a score of 1 for the combination with the maximum value of the sub-aspect from all combinations,
assigning a score of 0 for the combination with the minimum value of the sub-aspect from all combinations,
calculating a score for other combinations by dividing the corresponding sub-aspect value of the current combination by the maximum value of the sub-aspect among the combinations, and calculating for each sub-aspect a low distribution score by assigning a score of 1 for the combination with the minimum value of the sub-aspect from all combinations, assigning a score of 0 for the combination with the maximum value of the sub-aspect from all combinations, calculating a score for other combinations by dividing the corresponding sub-aspect value of the current combination by the minimum value of the sub-aspect among the combinations, In some embodiments, and in conjunction with the method 1200, a level of goodness is calculated for each one of the combinations by at least one of:

assigning weights to all the sub-aspects such that the weights sum up to 1, assigning weights to the high-level aspects and then assign weights to the sub-aspects such that at each level the weights sum up to 1, using default weights, and calculating the level of goodness of a combination as a weighted aggregation of all the scores of the combination.

In some embodiments, and in conjunction with the method 1200, one or more combinations with the highest level of goodness may be selected relative to all combinations.

It should be noted that, as it pertains to the present invention, any machine learning/deep learning model and/or algorithm may be employed in context with the functionality described herein. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method for selecting an optimal combination of cloud resources within budget constraints, by a processor, comprising:
   computing all possible combinations for cloud resource bundles as available for allocation;
   filtering the possible combinations according to predetermined criteria, wherein filtering the possible combinations includes:
      filtering possible combinations having a total cost that exceeds a remaining safe budget for cloud resource allocation, if an input budget constraint is hard, and
      filtering possible combinations having the total cost that exceeds a sum of the remaining safe budget and a budget overflow limit, if the input budget constraint is soft;
   dividing the filtered possible combinations into a first set that satisfies an overall workload demand for resources required for a workload offloaded to cloud resources and a second set that partially satisfies the overall workload demand for resources;
   in response to determining the first set is not empty:
      calculating a level of goodness for each of the filtered possible combinations in the first set;
      ordering the filtered possible combinations in the first set by a respective level of goodness;
      selecting for provisioning one of the filtered possible combinations from the first set based on the ordering;
      provisioning the one of the filtered possible combinations from the first set to the workload offloaded to the cloud resources; and
      executing the workload offloaded to the cloud resources by respective hardware resources in the provisioned one of the filtered possible combinations from the first set;
   in response to determining the first set is empty and the overall workload demand is not required to be fully satisfied:
      calculating the level of goodness for each of the filtered possible combinations in the second set;
      ordering the filtered possible combinations in the second set by a respective level of goodness; and
      selecting for provisioning one of the filtered possible combinations from the second set based on the ordering;
      provisioning the one of the filtered possible combinations from the second set to the workload offloaded to the cloud resources; and
      executing the workload offloaded to the cloud resources by respective hardware resources in the provisioned one of the filtered possible combinations from the second set; and
   wherein the level of goodness for each of the filtered possible combinations in the first set or in the second set is determined by respectively computing an overall score independently for each of compute power, the total cost, and a distribution or co-location of resources of each of a respective filtered possible combination in the first set or in the second set; wherein for each of the filtered possible combinations in the first set or in the second set, each overall score for the compute power, the total cost, and the distribution or co-location of resources of the respective filtered possible combination in the first set or in the second set is computed as a weighted aggregation of scores assigned to respective aspects within the compute power, the total cost, and the distribution or co-location of resources of the respective filtered possible combination in the first set or in the second set.

2. The method of claim 1, further comprising configuring attributes for each cloud resource bundle, the attributes including at least one of:
   a maximum number of instances allowed for allocation;
   a cost of an instance;
   a number of instances currently available for allocation; and
   a number of instances to be allocated in a specific combination of the cloud resource bundles.

3. The method of claim 2, further comprising assigning allocation values for each one of the cloud resource bundles, wherein an allocation value for a respective cloud resource bundle ranges from zero to the maximum number of instances allowed for allocation for the respective cloud resource bundle, and wherein the allocation value for the respective cloud resource bundle indicates a number of instances to allocate of the respective cloud resource bundle.

4. The method of claim 1, wherein filtering the possible combinations further includes at least one of:
filtering possible combinations that include at least one cloud resource bundle whose number of instances to allocate exceeds the number of instances currently available for allocation; and
filtering possible combinations that include at least one cloud resource bundle whose specification includes at least one sub-resource amount which is smaller than a corresponding amount in a minimum workload resource requirement.

5. The method of claim 1, further comprising:
computing the overall score for the compute power of the respective filtered possible combination in the first set or in the second set by:
defining the aspects of the compute power to be inclusive of at least one of: processor cores, memory, storage, network bandwidth, and input/output (I/O) capacity of the respective filtered possible combination in the first set or in the second set, wherein the score for each aspect of the compute power is between 0 and 1; and
computing the overall score for the total cost of the respective filtered possible combination in the first set or in the second set by:
calculating an aggregated cost of all individual cloud resource bundles in the respective filtered possible combination in the first set or in the second set;
comparing the aggregated cost of the respective filtered possible combination in the first set or in the second set with a minimum aggregated cost among the filtered possible combinations;
dividing the minimum aggregated cost by the aggregated cost of the respective filtered possible combination in the first set or in the second set;
calculating a cost score between 0 and 1 for the respective filtered possible combination in the first set or in the second set; and
assigning the cost score of 1 to one of the filtered possible combinations having a minimum cost respective to all other filtered possible combinations.

6. The method of claim 5, further comprising computing the overall score for the distribution or co-location of resources for each of the filtered possible combinations in the first set or in the second set by:
defining the aspects of the distribution or co-location of resources to include at least one of: a total number of cloud resource bundles, a number of distinct cloud resource bundles, a number of distinct reliability zones, and a number of distinct cloud providers;
calculating, for one of the aspects, a high distribution score by assigning the high distribution score of 1 to a respective possible combination having a maximum value of the one of the aspects;
assigning the high distribution score of 0 to a respective possible combination having a minimum value of the one of the aspects;
calculating a high distribution score for each of the filtered possible combinations in the first set or in the second set by dividing a value of the one of the aspects of the respective filtered possible combination in the first set or in the second set by the maximum value of the one of the aspects among each remaining possible combination;
calculating, for the one of the aspects a low distribution score by assigning the low distribution score of 1 for the respective possible combination having the minimum value of the one of the aspects;
assigning the low distribution score of 0 for the respective possible combination having the maximum value of the one of the aspects; and
calculating a low distribution score for each of the filtered possible combinations in the first set or in the second set by dividing a value of the one of the aspects of the respective filtered possible combination in the first set or in the second set by the minimum value of the one of the aspects.

7. A system for selecting an optimal combination of cloud resources within budget constraints, comprising:
a processor executing instructions stored in a memory device; wherein the processor:
computes all possible combinations for cloud resource bundles as available for allocation;
filters the possible combinations according to predetermined criteria, wherein filtering the possible combinations includes:
filtering possible combinations having a total cost that exceeds a remaining safe budget for cloud resource allocation, if an input budget constraint is hard, and
filtering possible combinations having the total cost that exceeds a sum of the remaining safe budget and a budget overflow limit, if the input budget constraint is soft;
divides the filtered possible combinations into a first set that satisfies an overall workload demand for resources required for a workload offloaded to cloud resources and a second set that partially satisfies the overall workload demand for resources;
in response to determining the first set is not empty:
calculates a level of goodness for each of the filtered possible combinations in the first set;
orders the filtered possible combinations in the first set by a respective level of goodness;
selects for provisioning one of the filtered possible combinations from the first set based on the ordering;
provisions the one of the filtered possible combinations from the first set to the workload offloaded to the cloud resources; and
executes the workload offloaded to the cloud resources by respective hardware resources in the provisioned one of the filtered possible combinations from the first set;
in response to determining the first set is empty and the overall workload demand is not required to be fully satisfied:
calculates the level of goodness for each of the filtered possible combinations in the second set;
orders the filtered possible combinations in the second set by a respective level of goodness; and
selects for provisioning one of the filtered possible combinations from the second set based on the ordering;
provisions the one of the filtered possible combinations from the second set to the workload offloaded to the cloud resources; and
executes the workload offloaded to the cloud resources by respective hardware resources in the provisioned one of the filtered possible combinations from the second set; and wherein the level of goodness for each of the filtered possible combinations in the first set or in the second set is determined by respectively computing an overall score independently for each of compute power, the total cost, and a distribution or co-location of resources of each of a respective filtered possible combination in the first set or in the second set; wherein for each of the filtered possible combinations in the first set or in the second set, each overall score for the compute power, the total cost, and the distribution or co-location of resources of the respective filtered possible combination in the first set or in the second set is computed as a weighted aggregation of scores assigned to respective aspects within the compute power, the total cost, and the distribution or co-location of resources of the respective filtered possible combination in the first set or in the second set.

8. The system of claim 7, wherein the processor configures attributes for each cloud resource bundle, the attributes including at least one of:
   a maximum number of instances allowed for allocation;
   a cost of an instance;
   a number of instances currently available for allocation; and
   a number of instances to be allocated in a specific combination of the cloud resource bundles.

9. The system of claim 8, wherein the processor assigns allocation values for each one of the cloud resource bundles, wherein an allocation value for a respective cloud resource bundle ranges from zero to the maximum number of instances allowed for allocation for the respective cloud resource bundle, and wherein the allocation value for the respective cloud resource bundle indicates a number of instances to allocate of the respective cloud resource bundle.

10. The system of claim 7, wherein filtering the possible combinations further includes at least one of:
   filtering possible combinations that include at least one cloud resource bundle whose number of instances to allocate exceeds the number of instances currently available for allocation; and
   filtering possible combinations that include at least one cloud resource bundle whose specification includes at least one sub-resource amount which is smaller than a corresponding amount in a minimum workload resource requirement.

11. The system of claim 7, wherein the processor:
   computes the overall score for the compute power of the respective filtered possible combination in the first set or in the second set by:
      defining the aspects of the compute power to be inclusive of at least one of: processor cores, memory, storage, network bandwidth, and input/output (I/O) capacity of the respective filtered possible combination in the first set or in the second set, wherein the score for each aspect of the compute power is between 0 and 1; and
   computing the overall score for the total cost of the respective filtered possible combination in the first set or in the second set by:
      calculating an aggregated cost of all individual cloud resource bundles in the respective filtered possible combination in the first set or in the second set;
      comparing the aggregated cost of the respective filtered possible combination in the first set or in the second set with a minimum aggregated cost among the filtered possible combinations;
      dividing the minimum aggregated cost by the aggregated cost of the respective filtered possible combination in the first set or in the second set;
      calculating a cost score between 0 and 1 for the respective filtered possible combination in the first set or in the second set; and
      assigning the cost score of 1 to one of the filtered possible combinations having a minimum cost respective to all other filtered possible combinations.

12. The system of claim 11, wherein the processor computes the overall score for the distribution or co-location of resources for each of the filtered possible combinations in the first set or in the second set by:
   defining the aspects of the distribution or co-location of resources to include at least one of: a total number of cloud resource bundles, a number of distinct cloud resource bundles, a number of distinct reliability zones, and a number of distinct cloud providers;
   calculating, for one of the aspects, a high distribution score by assigning the high distribution score of 1 to a respective possible combination having a maximum value of the one of the aspects;
   assigning the high distribution score of 0 to a respective possible combination having a minimum value of the one of the aspects;
   calculating a high distribution score for each of the filtered possible combinations in the first set or in the second set by dividing a value of the one of the aspects of the respective filtered possible combination in the first set or in the second set by the maximum value of the one of the aspects;
   calculating, for the one of the aspects a low distribution score by assigning the low distribution score of 1 for the respective possible combination having the minimum value of the one of the aspects;
   assigning the low distribution score of 0 for the respective possible combination having the maximum value of the one of the aspects; and
   calculating a low distribution score for each of the filtered possible combinations in the first set or in the second set by dividing a value of the one of the aspects of the respective filtered possible combination in the first set or in the second set by the minimum value of the one of the aspects.

13. A computer program product for selecting an optimal combination of cloud resources within budget constraints, the computer program product comprising a non-transitory computer-readable storage medium having computer-readable program code portions stored therein, the computer-readable program code portions comprising:
   an executable portion that computes all possible combinations for cloud resource bundles as available for allocation;
   an executable portion that filters the possible combinations according to predetermined criteria, wherein filtering the possible combinations includes:
      filtering possible combinations having a total cost that exceeds a remaining safe budget for cloud resource allocation, if an input budget constraint is hard, and
      filtering possible combinations having the total cost that exceeds a sum of the remaining safe budget and a budget overflow limit, if the input budget constraint is soft;
      divides the filtered possible combinations into a first set that satisfies an overall workload demand for resources required for a workload offloaded to cloud resources and a second set that partially satisfies the overall workload demand for resources;
   an executable portion that, in response to determining the first set is not empty:
      calculates a level of goodness for each of the filtered possible combinations in the first set;

orders the filtered possible combinations in the first set by a respective level of goodness;

selects for provisioning one of the filtered possible combinations from the first set based on the ordering;

provisions the one of the filtered possible combinations from the first set to the workload offloaded to the cloud resources; and executes the workload offloaded to the cloud resources by respective hardware resources in the provisioned one of the filtered possible combinations from the first set;

an executable portion that, in response to determining the first set is empty and the overall workload demand is not required to be fully satisfied:

calculates the level of goodness for each of the filtered possible combinations in the second set;

orders the filtered possible combinations in the second set by a respective level of goodness; and selects for provisioning one of the filtered possible combinations from the second set based on the ordering;

provisions the one of the filtered possible combinations from the second set to the workload offloaded to the cloud resources; and executes the workload offloaded to the cloud resources by respective hardware resources in the provisioned one of the filtered possible combinations from the second set; and wherein the level of goodness for each of the filtered possible combinations in the first set or in the second set is determined by respectively computing an overall score independently for each of compute power, the total cost, and a distribution or co-location of resources of each of a respective filtered possible combination in the first set or in the second set; wherein for each of the filtered possible combinations in the first set or in the second set, each overall score for the compute power, the total cost, and the distribution or co-location of resources of the respective filtered possible combination in the first set or in the second set is computed as a weighted aggregation of scores assigned to respective aspects within the compute power, the total cost, and the distribution or co-location of resources of the respective filtered possible combination in the first set or in the second set.

14. The computer program product of claim 13, further comprising an executable portion that configures attributes for each cloud resource bundle, the attributes including at least one of:

a maximum number of instances allowed for allocation;
a cost of an instance;
a number of instances currently available for allocation; and
a number of instances to be allocated in a specific combination of the cloud resource bundles.

15. The computer program product of claim 14, further comprising an executable portion that assigns allocation values for each one of the cloud resource bundles, wherein an allocation value for a respective cloud resource bundle ranges from zero to the maximum number of instances allowed for allocation for the respective cloud resource bundle, and wherein the allocation value for the respective cloud resource bundle indicates a number of instances to allocate of the respective cloud resource bundle.

16. The computer program product of claim 13, wherein filtering the possible combinations further includes at least one of:

filtering possible combinations that include at least one cloud resource bundle whose number of instances to allocate exceeds the number of instances currently available for allocation; and filtering possible combinations that include at least one cloud resource bundle whose specification includes at least one sub-resource amount which is smaller than a corresponding amount in a minimum workload resource requirement.

17. The computer program product of claim 13, further comprising an executable portion that:

computes the overall score for the compute power of the respective filtered possible combination in the first set or in the second set by:

defining the aspects of the compute power to be inclusive of at least one of: processor cores, memory, storage, network bandwidth, and input/output (I/O) capacity of the respective filtered possible combination in the first set or in the second set, wherein the score for each aspect of the compute power is between 0 and 1; and computing the overall score for the total cost of the respective filtered possible combination in the first set or in the second set by:

calculating an aggregated cost of all individual cloud resource bundles in the respective filtered possible combination in the first set or in the second set;

comparing the aggregated cost of the respective filtered possible combination in the first set or in the second set with a minimum aggregated cost among the filtered possible combinations;

dividing the minimum aggregated cost by the aggregated cost of the respective filtered possible combination in the first set or in the second set;

calculating a cost score between 0 and 1 for the respective filtered possible combination in the first set or in the second set; and assigning the cost score of 1 to one of the filtered possible combinations having a minimum cost respective to all other identified filtered possible combinations.

18. The computer program product of claim 17, further comprising an executable portion that computes the overall score for the distribution or co-location of resources for each of the filtered possible combinations in the first set or in the second set by:

defining the aspects of the distribution or co-location of resources to include at least one of: a total number of cloud resource bundles, a number of distinct cloud resource bundles, a number of distinct reliability zones, and a number of distinct cloud providers;

calculating, for one of the aspects, a high distribution score by assigning the high distribution score of 1 to a respective possible combination having a maximum value of the one of the aspects;

assigning the high distribution score of 0 to a respective possible combination having a minimum value of the one of the aspects;

calculating a high distribution score for each of the filtered possible combinations in the first set or in the second set by dividing a value of the one of the aspects of the respective filtered possible combination in the first set or in the second set by the maximum value of the one of the aspects;

calculating, for the one of the aspects a low distribution score by assigning the low distribution score of 1 for the respective possible combination having the minimum value of the one of the aspects;

assigning the low distribution score of 0 for the respective possible combination having the maximum value of the one of the aspects; and calculating a low distribution score for each of the filtered possible combinations in the first set or in the second set by dividing a value of the one of the aspects of the respective filtered possible combination in the first set or in the second set by the minimum value of the one of the aspects.

\* \* \* \* \*